(12) United States Patent
Subbaraman et al.

(10) Patent No.: US 9,377,155 B2
(45) Date of Patent: Jun. 28, 2016

(54) PORTABLE-DEVICE PRESENTATION SYSTEM

(71) Applicants: Kavitha Subbaraman, Coppell, TX (US); Rajagopalan Swaminathan, Coppell, TX (US)

(72) Inventors: Kavitha Subbaraman, Coppell, TX (US); Rajagopalan Swaminathan, Coppell, TX (US)

( * ) Notice: Subject to any disclaimer, the term of this patent is extended or adjusted under 35 U.S.C. 154(b) by 56 days.

(21) Appl. No.: 14/175,255

(22) Filed: Feb. 7, 2014

(65) Prior Publication Data

US 2014/0151523 A1    Jun. 5, 2014

Related U.S. Application Data

(63) Continuation-in-part of application No. 13/352,305, filed on Jan. 17, 2012, now abandoned.

(60) Provisional application No. 61/919,608, filed on Dec. 20, 2013.

(51) Int. Cl.
  *B43L 3/00*   (2006.01)
  *F16M 11/10*  (2006.01)
  *A47B 97/00*  (2006.01)
  *B43L 5/02*   (2006.01)

(52) U.S. Cl.
  CPC ...... *F16M 11/10* (2013.01); *B43L 3/00* (2013.01); *B43L 3/005* (2013.01); *B43L 3/008* (2013.01); *B43L 5/02* (2013.01); *B43L 5/025* (2013.01); *A47B 97/00* (2013.01)

(58) Field of Classification Search
  CPC ........ A47B 97/00; A47B 97/04; A47B 97/06; A47B 97/08; B43L 3/00; B43L 3/005; B43L 3/008; B43L 5/02; B43L 5/025; F16M 11/10

USPC .................................................. 248/460, 461
  See application file for complete search history.

(56) References Cited

U.S. PATENT DOCUMENTS

| 2,586,524 | A | * | 2/1952 | Dussardier | 312/231 |
| 3,202,471 | A | * | 8/1965 | Wilson | 312/231 |
| 3,378,322 | A | * | 4/1968 | Johnson | 312/231 |
| 3,514,173 | A | * | 5/1970 | Ford | A47B 97/08 248/461 |

(Continued)

FOREIGN PATENT DOCUMENTS

| FR | 1450682 | * | 6/1966 | A47B 97/08 |
| GB | 631153 | * | 10/1949 | A47B 97/08 |

(Continued)

*Primary Examiner* — Joshua Rodden
(74) *Attorney, Agent, or Firm* — Craige Thompson; Thompson Patent Law

(57) ABSTRACT

Apparatus and associated methods relate to a portable-device presentation system having a substantially-planar substrate; a first clamp coupled to the substrate; and a second clamp slidably coupled to the substrate, each of the first and second clamps having respective opposing contact surfaces that have substantially no curvature along axes substantially parallel to the substantially-planar substrate at a contact elevation above the substantially-planar substrate, wherein when a user slides the second clamp to a maximum display-size position and lays a display device on the substantially-planar substrate between the first clamp and the second clamp, the user may then secure the display device to the presentation system by sliding the second clamp to sandwich the display device between the two respective opposing contact surfaces and securing the second clamp using a hand-operated securing member. In various embodiments, a presentation system may secure portable display devices of many different sizes.

16 Claims, 8 Drawing Sheets

(56) References Cited

U.S. PATENT DOCUMENTS 3,669,227 A * 6/1972 Alford .......................... 190/11
3,907,360 A * 9/1975 Czarnowski .................. 297/156
4,149,763 A * 4/1979 Delahaie ...................... 312/231
4,317,606 A * 3/1982 Hastings ...................... 312/231
5,833,201 A * 11/1998 Graybill ....................... 248/462
2004/0031900 A1 * 2/2004 Chang .......................... 248/461
2008/0191113 A1 * 8/2008 Edgmon et al. ............... 248/451

FOREIGN PATENT DOCUMENTS

| GB | 715620 | * | 9/1954 | ............. A47B 97/08 |
| WO | WO 9428767 A1 | * | 12/1994 | ............. A47B 97/08 |

* cited by examiner

PORTABLE-DEVICE PRESENTATION SYSTEM

CROSS-REFERENCE TO RELATED APPLICATIONS

The instant application is a continuation-in-part of U.S. patent application Ser. No. 13/352,305, entitled "Substrate-Retaining Holder," filed by Subbaraman, et al., on Jan. 17, 2012. The instant application also claims the benefit of U.S. Provisional Application Ser. No. 61/919,608, entitled "Accessory Station," filed by Subbaraman, et al., on Dec. 20, 2013. The entirety of each of the foregoing priority applications is hereby incorporated by reference.

TECHNICAL FIELD

Various embodiments relate generally to apparatuses or methods for holding portable objects for presentation to a user and/or providing an activity center for learning or recreation.

BACKGROUND

Many mobile devices have a display for visibly presenting information to a user. Many such devices have a Graphical User Interface which may permit a user to input information to the mobile device. Some of these devices have touch screens which permit both the device to present information to the user, and the user to input information into the device. Such mobile devices are offered in a variety of sizes and form factors. Some mobile display devices, such as some iPods® mobile digital devices (commercially available from Apple, Inc. of Washington) are little more than an inch in their longest dimension. Other mobile devices, such as some laptop computers may have very large display screens, perhaps sixteen inches across or more. Various thicknesses may be found in the mobile device population, as well. Such devices may perform useful functions and may provide entertainment to those who make use of them.

Each type of mobile display may be optimally presented in a manner that is appropriate for that device. Other portable devices may be presented to a user in a variety of manners. For example, books may be presented to a user in an open book manner. A board game, for example, may be best presented on a flat surface.

SUMMARY

Apparatus and associated methods relate to a portable-device presentation system having a substantially-planar substrate; a first clamp coupled to the substrate; and a second clamp slidably coupled to the substrate, each of the first and second clamps having respective opposing contact surfaces that have substantially no curvature along axes substantially parallel to the substantially-planar substrate at a contact elevation above the substantially-planar substrate, wherein when a user slides the second clamp to a maximum display-size position and lays a display device on the substantially-planar substrate between the first clamp and the second clamp, the user may then secure the display device to the presentation system by sliding the second clamp to sandwich the display device between the two respective opposing contact surfaces and securing the second clamp using a hand-operated securing member. In various embodiments, a presentation system may secure portable display devices of many different sizes.

In some embodiments, the first and second clamps may each have a capturing feature that projects above the display device when captured, the projecting features being located at a higher elevation with respect to the substantially-planar surface than the elevations at which the display device contacts the contacting faces of the two clamps. The distance between the two projecting features as measured at the elevation of the projecting features may be less than the dimension of the display device as measured at the elevation at which the display device contacts the contacting faces.

In some embodiments, a presentation system may be securable to a table top. For example, an exemplary presentation system may have suction cups on a bottom side to secure to flat surfaces. Belts and/or straps may be used to secure an exemplary presentation system to a shopping cart or a highchair. In some embodiments, the presentation system may be securable to a substrate retaining holder. Exemplary presentation systems may have standing features to facilitate non-horizontal presentations of the display screen. For example, a flip-out stand may be used in conjunction with a front end of the presentation system in a tri-pod fashion to present the display device at a non-horizontal angle. Some exemplary presentation systems may adjust to securely hold a display device in either landscape or portrait mode orientations.

Various embodiments may achieve one or more advantages. For example, some embodiments may provide continuous adjustability to accommodate portable devices having a dimension between the maximum adjustment distance and the minimum adjustment distance. For example, an exemplary presentation system may securely hold a cell phone or an iPad, for example. Other exemplary portable devices, such as a book or a game, may be securely presented to a user. Exemplary presentation systems may protect an attached display device during a fall event by projecting features at elevations above the surface of a display screen which may contact the floor before the display screen should the presentation system fall. In some embodiments, the presentation system may securely hold a portable device permitting a young child to use the device without risk of the child breaking the device.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary use of an exemplary portable-device presentation system is briefly introduced with reference to FIG. 1. Second, with reference to FIGS. 2A-3, the discussion turns to exemplary embodiments of portable-device presentation systems. Then, exemplary portable activity centers will be discussed with reference to FIGS. 4-5. Finally, with reference to FIG. 6, the coupling of portable-device presentation systems to portable activity centers will be described.

Figure 1:
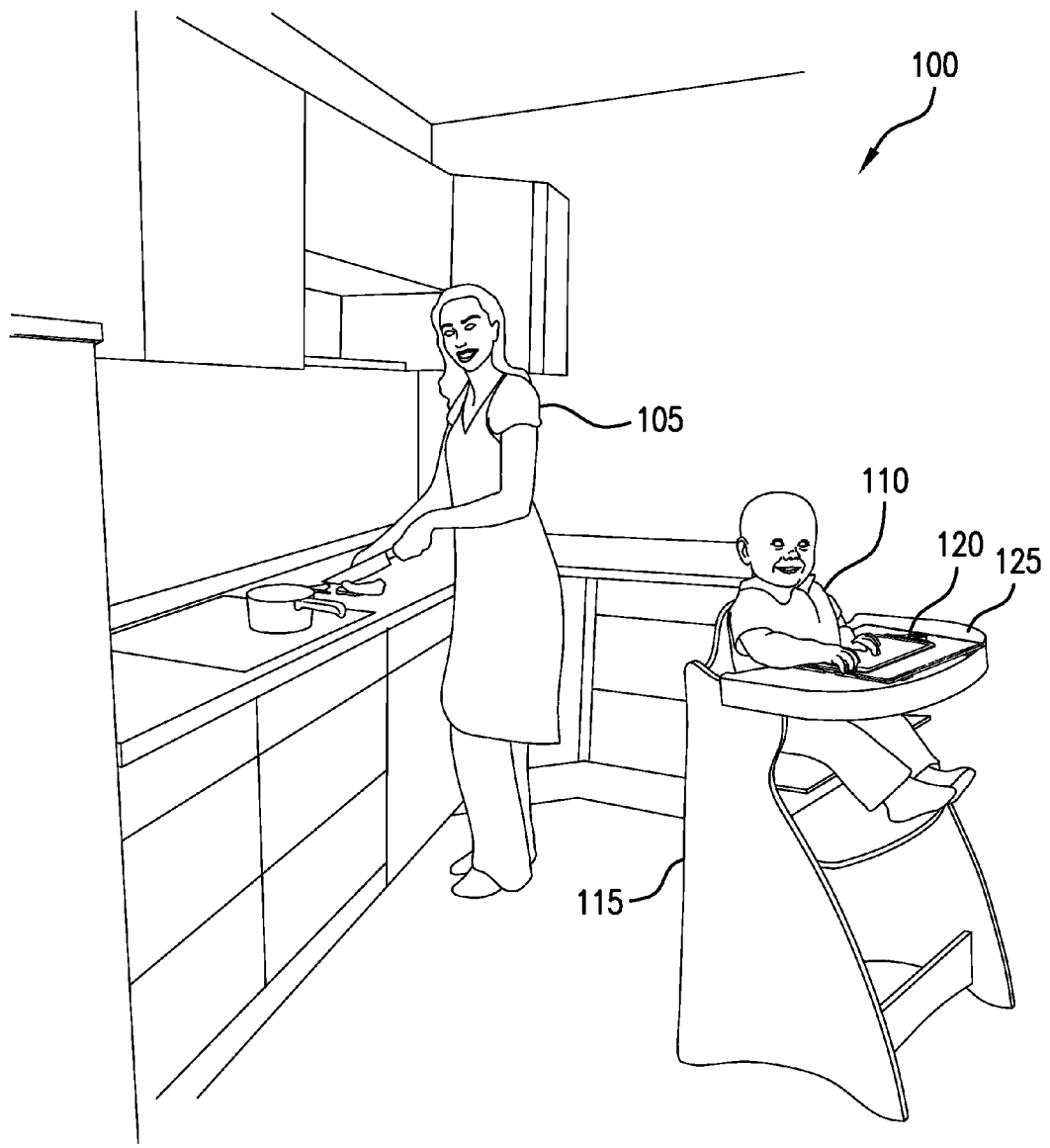
FIG. 1 depicts a scenario in which an exemplary portable-device presentation system may be used to entertain a child.

FIG. 1 depicts a scenario in which an exemplary portable-device presentation system may be used to entertain a child. The FIG. 1 scenario is a kitchen setting 100, in which a mother 105 is cooking while a baby 110 is belted into a high chair 115. To occupy the baby 110, the mother 105 has affixed an exemplary portable-device presentation system 120 to a tray 125 of the high chair 115. The presentation system 120 may be releasably but securely attached to the tray 125 so that the baby may not remove the presentation system 120 and drop it to a floor. The presentation system 120 may have a mobile display device releasably but securely attached to the presentation system 120. The presentation system 120 may have a device holder that is capable of securely holding a variety of differently sized mobile display devices. For example, the mobile display device may be a smart-phone or a tablet computer. The presentation system 120 may have a presentation module that may orient the mobile display device so as to present a display screen for the baby 110 to see. In an illustrative embodiment, the presentation system may advantageously provide a display interface system that may releasably and securely attach a variety of mobile display devices to a variety of apparatuses.

Figure 2A:
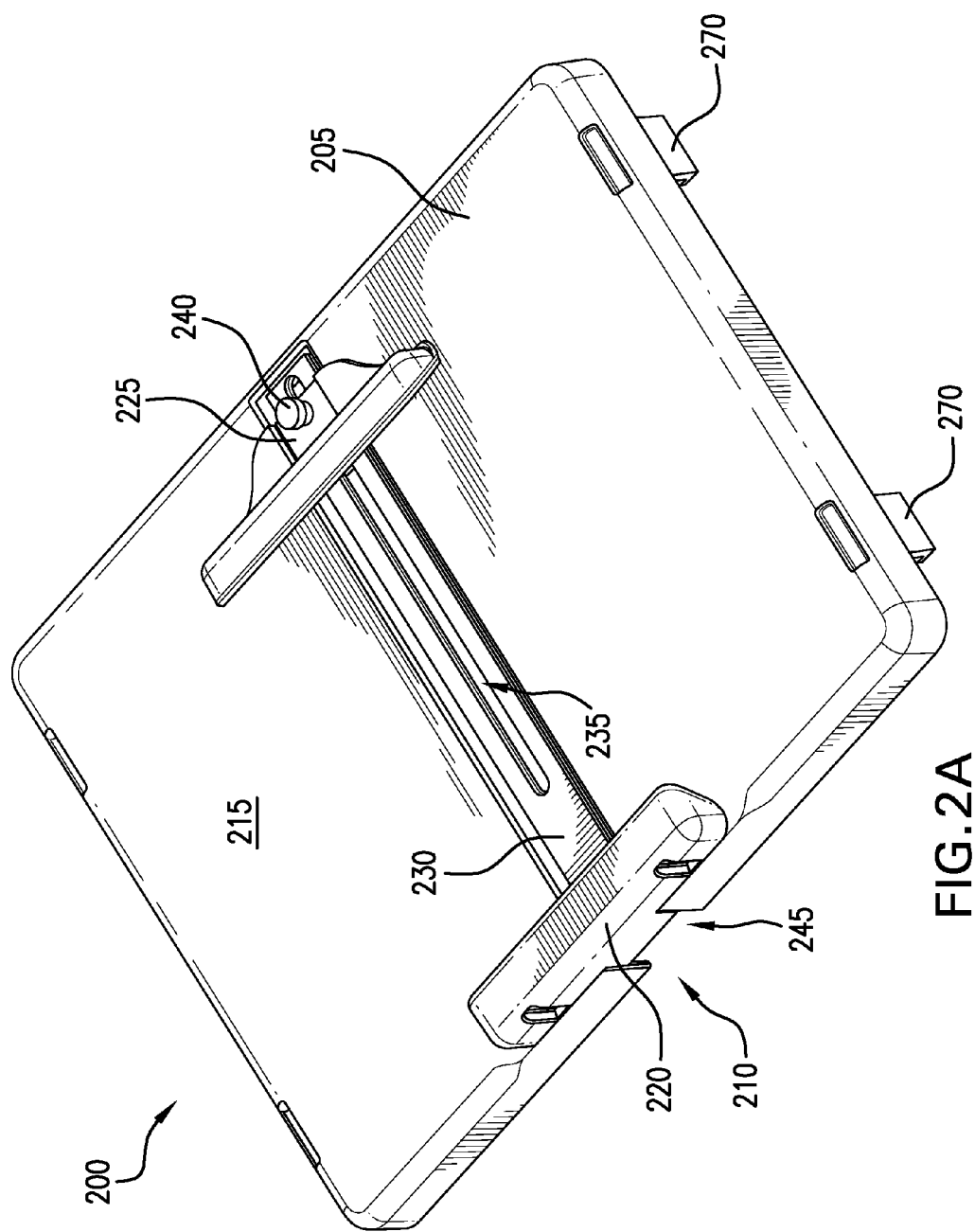
FIG. 2A depicts a perspective view of an exemplary portable-device presentation system.

FIG. 2A depicts a perspective view of an exemplary portable-device presentation system. In the FIG. 2A depiction, an exemplary portable-device presentation system 200 includes a substrate 205 and a portable-device holder 210. The substrate 205 has a substantially-planar top surface 215. A display device having a substantially-planar back surface may be laid upon the substantially-planar top surface 215 of the substrate. The portable-device holder 210 may then releasably and securely attach the display device to the presentation system 200. The depicted portable-device holder 210 has a first clamp member 220 and a second clamp member 225. In the depicted embodiment, the first and second clamp members 220, 225 may be attached to a beam 230. The first clamp member 220 may be rigidly attached to the beam 230, and the second clamp member 225 may be slidably attached to the beam 230. The depicted beam has a slot 235 for permitting a coupling member 240 to slidably secure the second clamp member 225 to the beam 230. The coupling member 240 may have a secure mode and a slidable mode. When in the secure mode, the second clamp member 225 may be securely coupled to the beam 230, and when in the slidable mode, the second clamp member 225 may be slidable along a length of the beam 230.

Various embodiments may have various portable-device holder arrangements. For example, an exemplary portable-device holder may have clamp members positioned to sandwich a portable device between clamps arranged along a lateral axis as depicted in FIG. 2A. Some embodiments may have portable-device holders having clamp members positioned to sandwich a portable device between clamps arranged along a longitudinal axis, for example. In some embodiments, both longitudinally aligned and laterally aligned clamp members may be included.

Various embodiments may be configured in various stand-along configurations. For example, some embodiments may not include attachment tabs 270 for attachment to another device. Some embodiments may include a carry handle (not depicted). Some embodiments may include a storage compartment. An exemplary storage compartment may be sized to store an exemplary mobile device. For example, a storage compartment may be sized to store a mobile display device, such as a table computer. The storage compartment may include space for storing auxiliary devices such as power adapters, for example. In some embodiments, a storage compartment may be accessed by opening a top surface. In some embodiments, a storage compartment may be accessed by opening a side access door, for example.

Various embodiments may be configured for non-horizontal presentation of a mobile device. For example, a secured mobile device may be presented to a user by vertically elevating an end of an exemplary portable-device presentation system. In some embodiments, a frame support member may be removably stowed in an underside of the portable-device presentation system, for example. A frame support member may be removed from a storage location and positioned to provide elevated support to an end of the portable-device presentation system, for example. Various connection methods for the elevated support member to provide stable support to the portable-device presentation system. For example, a picture-frame type of support member may be pivoted from a storage position to a support position. In some embodiments, a pole may be removed from a storage position and rigidly connected in a support position to provide an support leg in an elevated display orientation of the mobile-device presentation system.

Figure 2B:
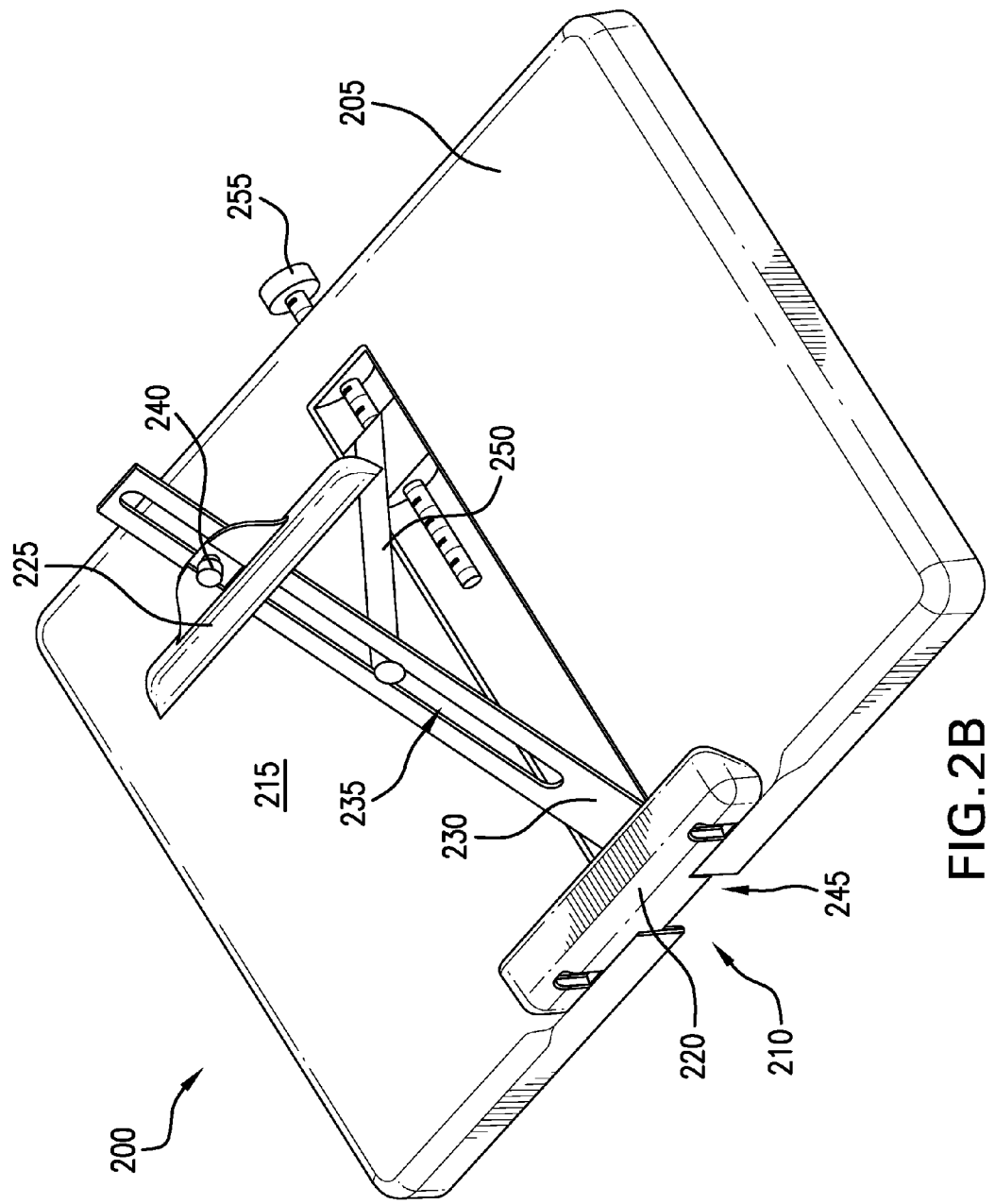
FIG. 2B depicts a perspective view of an exemplary portable-device presentation system positioned at a non-horizontal angle.

FIG. 2B depicts a perspective view of an exemplary portable-device presentation system positioned at a non-horizontal angle. In the depicted embodiment, the portable-device holder 210 may be pivotable with respect to the substrate 205. For example, the portable-device holder 210 may pivot between a coplanar position and a vertical position with respect to the top surface 215. For example, in some embodiments, the beam 230 may pivot near a base region 245 of the presentation system 200. In an exemplary embodiment a stand-securing member 250 may secure the angle of the portable-device holder 210. An angle-adjustment screw 255 may pivot the portable-device holder 210 to the desired viewing angle. The angle-adjustment screw 255 may slidably position the stand-securing member 250 within a channel.

Figure 2C:
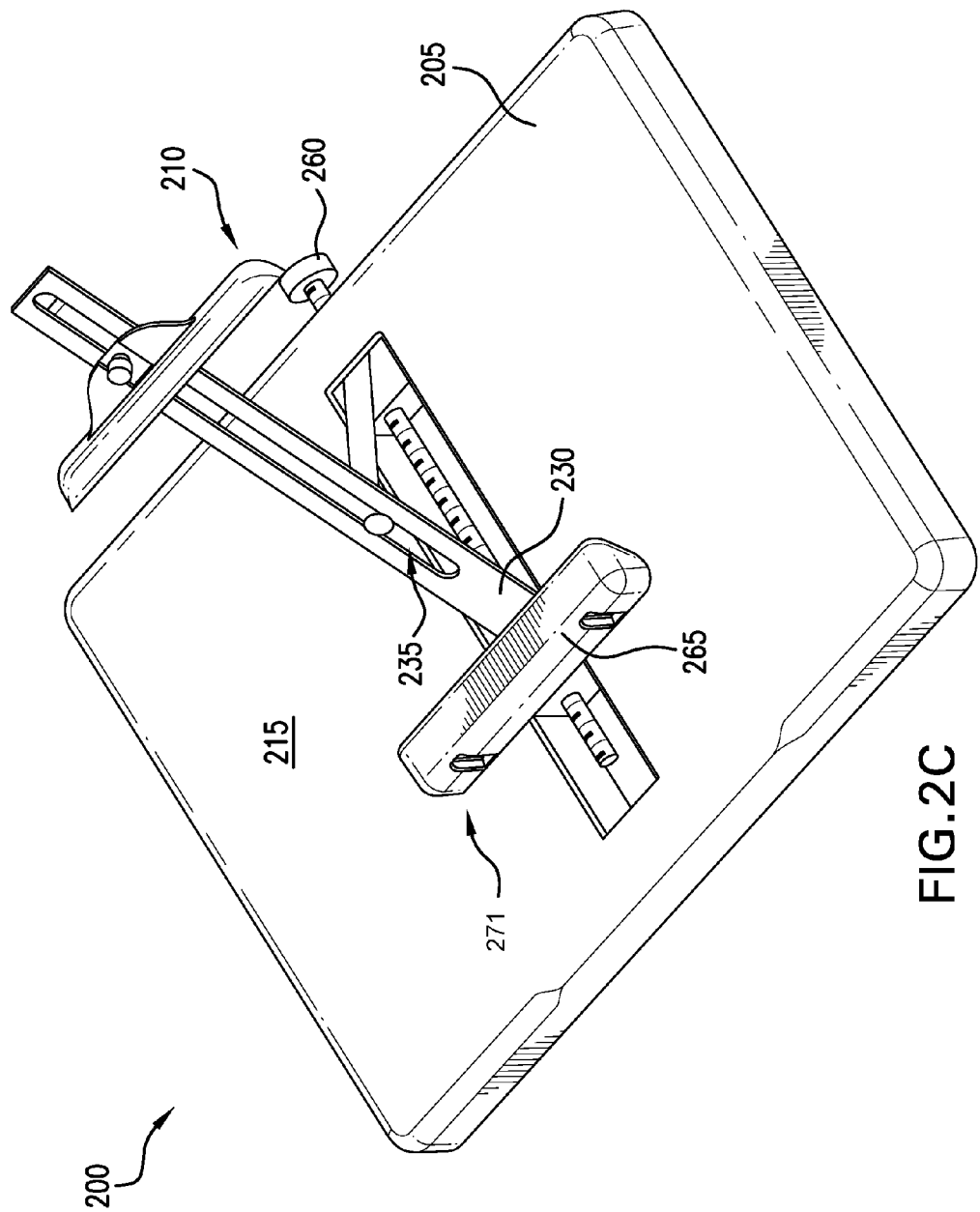
FIG. 2C depicts a perspective view of an exemplary portable-device presentation system positioned at a non-horizontal angle.

FIG. 2C depicts a perspective view of an exemplary portable-device presentation system positioned at a non-horizontal angle. In the depicted embodiment, an angle-adjustment screw 260 may position a base of a first clamp member 265 within a channel. The angle-adjustment screw 260 in this way may be used to pivot the portable-device holder 210 to the desired viewing angle. The embodiment depicted in FIG. 2C differs from that of FIG. 2C in the front-rear position of the pivoted display device on the top surface 215 of the presentation system 200. In the FIG. 2B embodiment, a base of the pivoted display device may be near the base region 245 of the presentation system 200. But in the FIG. 2C embodiment, a base of the display device may be positioned in a more distal or rearward region 271 of the presentation system 200. In some embodiment, the entire top surface 215 of the presentation system may pivot when a pivoting member is actuated.

Various mechanisms for pivoting the portable-device holder may be utilized. For example, in some embodiments a screw device may slide a member of the display device holder along a channel. In some embodiments, the slidable member may be a front member, each of which may be independently controllable by separate screws. In some embodiments the slidable member may be a rear member. In some examples, both front and rear member may slide in opposite directions in response to the screw member. In some exemplary embodiments, the pivoting means may include a spring loaded release member. For example when the spring loaded release member is actuated, the portable-device holder may be positioned in any pivotable orientation permitted by the released pivoting means, and then when the release member is released, the portable-device holder may be secured in that pivot orientation. When actuated, the spring loaded pivot release member may permit one or more members to slide in a channel, for example.

Various means for securing the presentation system to various apparatuses. In the FIG. 2A depiction, securing members 270 may provide releasable attachment to a portable drawing station, for example. In some embodiments, suction cups located on an underside may provide releasable attachment of the presentation system to a substantially-flat surface, for example. In an exemplary embodiment, securing straps may thread through strap slots to secure the presentation system to an apparatus. Securement of the presentation system may be to a back of a car seat or a shopping cart, for example.

Figure 3:
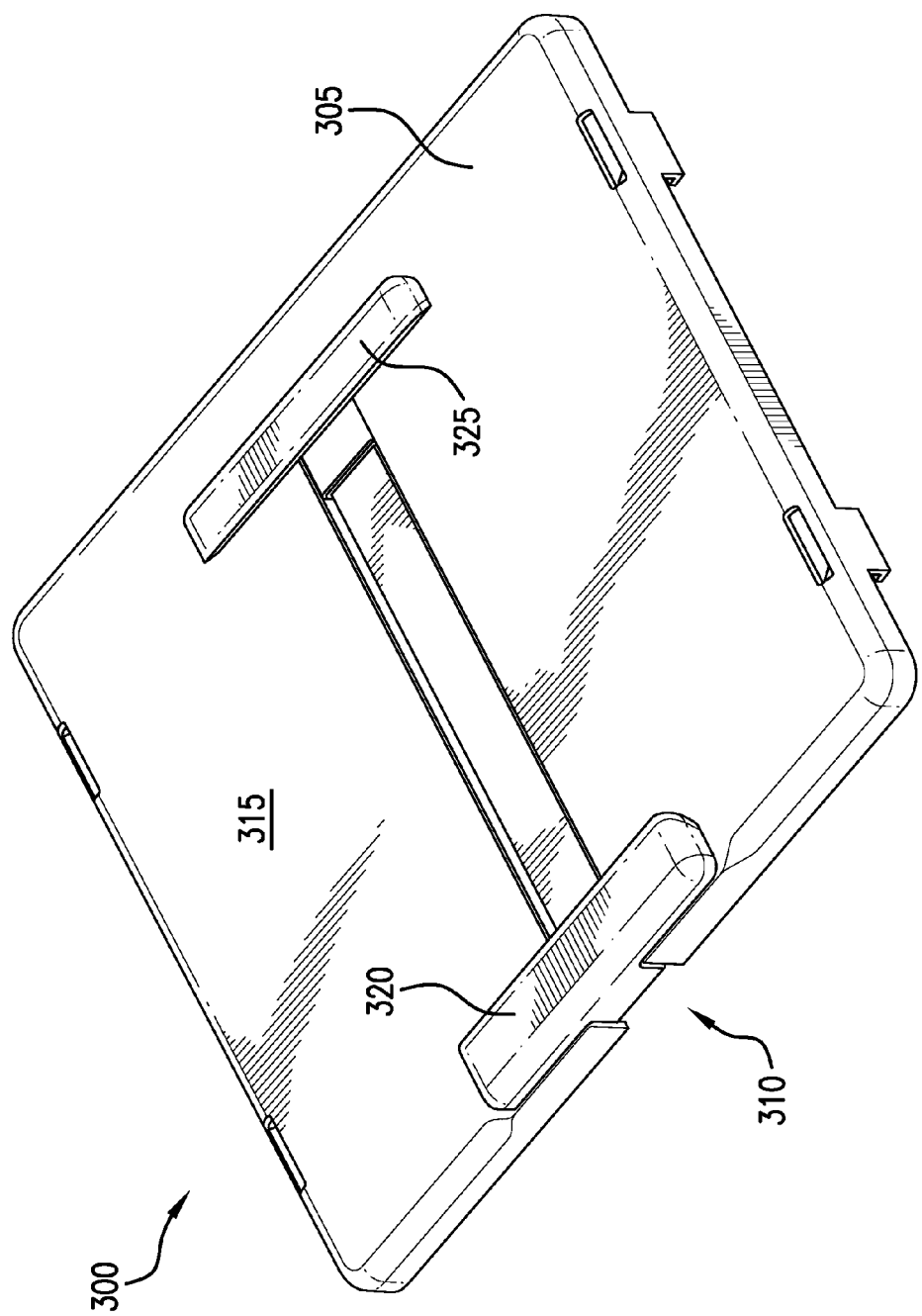
FIG. 3 depicts a perspective view of an exemplary portable-device presentation system.

FIG. 3 depicts a perspective view of an exemplary portable-device presentation system. In the FIG. 3 an exemplary portable-device presentation system 300 includes a substrate 305 and a portable-device holder 310. The substrate 305 has a substantially-planar top surface 315. A display device having a substantially-planar back surface may be laid upon the substantially-planar top surface 315 of the substrate. The portable-device holder 310 may then releasably and securely attach the display device to the presentation system 300. The depicted portable-device holder 310 has a first clamp member 320 and a second clamp member 325. In some embodiments, the first clamp member 320 may be rigidly attached to the substrate 305. The second clamp member 325 may be slidably attached to the substrate 305. The second clamp member 325 may be secured in a slidably position by releasing a spring loaded securing member. For example, a spring loaded release button (not depicted) may be located on a rear end of the substrate 305. Or, the second clamp member 325 may be pivoted to release a locking member and permit slidability of the second clamp member 325.

Figure 4:
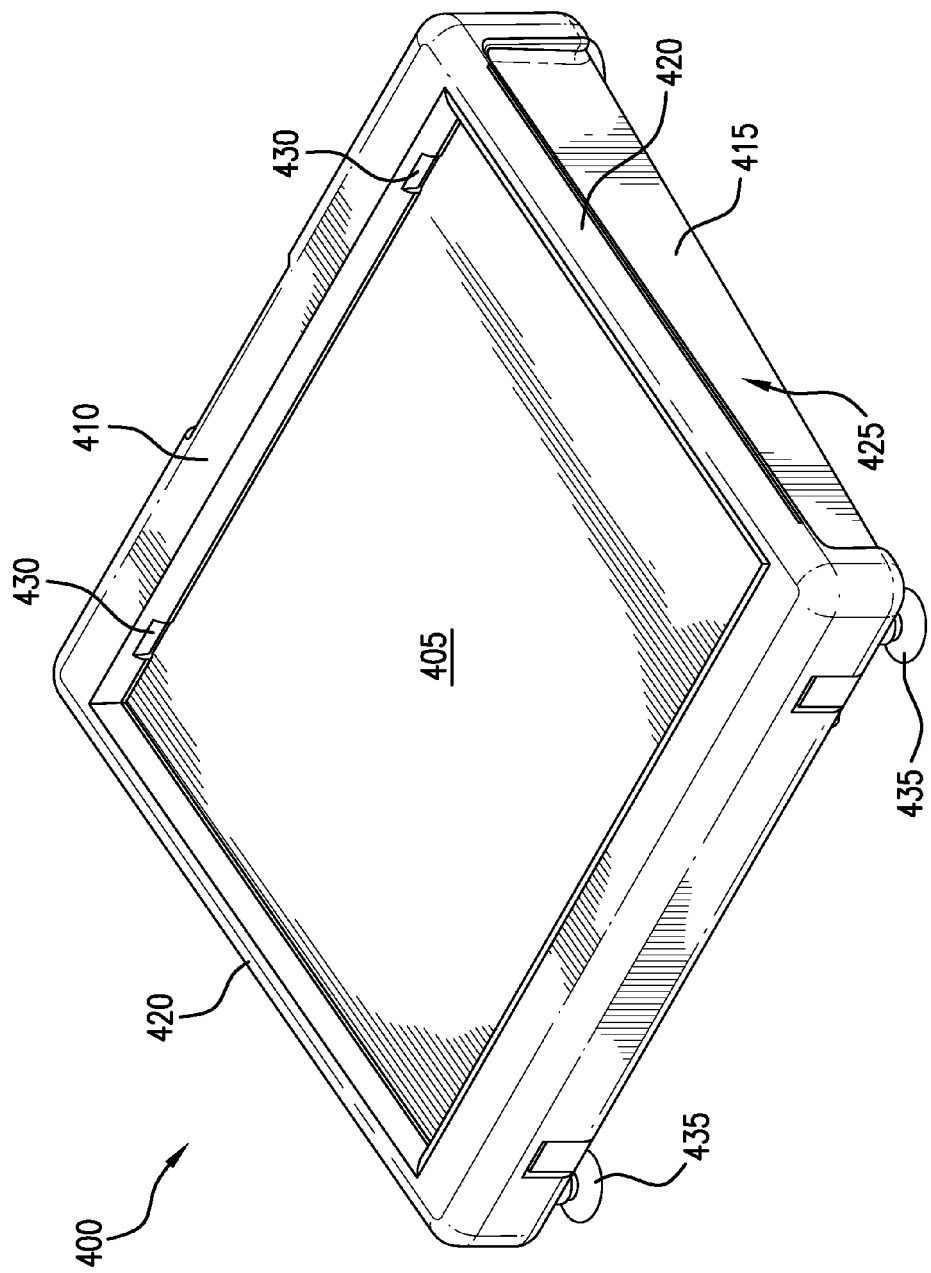
FIG. 4 depicts a perspective view of an exemplary portable drawing station.

FIG. 4 depicts a perspective view of an exemplary portable drawing station. In the FIG. 4 embodiment, an exemplary portable drawing station 400 includes a substantially planar work area 405 framed by a work piece holder 410. The work piece holder 410 may movably attach to a base unit 415. The base unit may have a storage space for things such as crayons and paper, for example. In some embodiments, the movable attachment of the work piece holder 410 may pivotably attach it to the base unit 415. In some embodiments the work piece holder 410 may slidably or removably attach to the base unit 415, for example.

Various portable activity centers may have various methods of securing paper to the substantially planar work area 405. A sheet of paper may be inserted through a slot located on one of the ends of a work piece holder 410. Exemplary work piece holders may frame a sheet of paper and secure the sheet around a periphery region of the sheet, for example. In some embodiments, the work piece holder 410 may hingedly open to facilitate the changing of sheets of paper. For example, when a user has completed a drawing, the work piece holder 410 may pivot from one of the ends of the portable drawing station, to an open position, for example. The finished drawing may be removed, and a new sheet placed upon the substantially planar work area 405. The work piece holder 410 may then be pivoted to a closed position, in which a peripheral region of the sheet of paper is sandwiched between the work piece holder 410 and the substantially planar work area 415.

In various embodiments, a roll of paper may feed paper to the substantially planar work area 405. For example, A spool receiving member may be located inside a storage area within the portable drawing station 400 may receive a spool of paper. A slotted aperture may permit an end of the spooled paper to feed paper to the substantially planar work area 405. The paper may be pulled through the aperture and over the substantially planar work area 405 to an exit slot on an end of the portable drawing station, for example. A steckled edge tearing device may be located near the exit slot. The paper may be torn by pulling the paper along the steckled edge tearing device, for example. The steckled edge tearing device may be safe to the touch, and still provide a steckled edge to facilitate the tearing of paper, for example. In some embodiments, the exit slot may be on a side of the portable drawing station opposite a side of the slotted aperture which feeds paper from the storage area to the substantially planar work area 405. In some embodiments, the spool receiving member may be a dowell. In some embodiments the spool receiving member may be a rod. In an exemplary embodiment, the spool receiving member may be affixed to an end of the portable drawing station. For example, a spool receiving member may be affixed to an external end of the portable drawing station. The paper may then feed the substantially planar work area 405 through a slot in the work piece holder 410.

Various portable activity centers may have various storage compartment configurations. For example, a crayon storage compartment may be configured to hold crayons of commercially available sizes. In some embodiments, paintbrush compartments may provide for storage of paint brushes, for example. In some embodiments a carrying handle may facilitate the carrying of the portable drawing station 400.

Various portable activity centers may have attachment features to which a portable-device presentation system may attach. For example, the depicted portable drawing station 400 has various features to which a presentation system may attach. A presentation system may have clips that attach to the work piece holder 410 at two lateral ends 420. The work piece holder 410 may extend laterally beyond ends of the base unit 415 creating a recess 425 on each side directly beneath an overhanging lateral 420 of the work piece holder. Other recesses 430 may provide attachment by a presentation system. In some embodiments attachment features may be complimentary to those of the presentation system.

Portable activity centers may also have attachment members for coupling the portable activity centers to various apparatuses. In the depicted embodiment, suction cups 435 may be used to attach the portable drawing station 400 to a flat surface. The suction cups may be pivotable into recesses in a bottom of the portable activity center 400, for example. Similar attachment means may be used in portable-device presentation systems.

Figure 5:
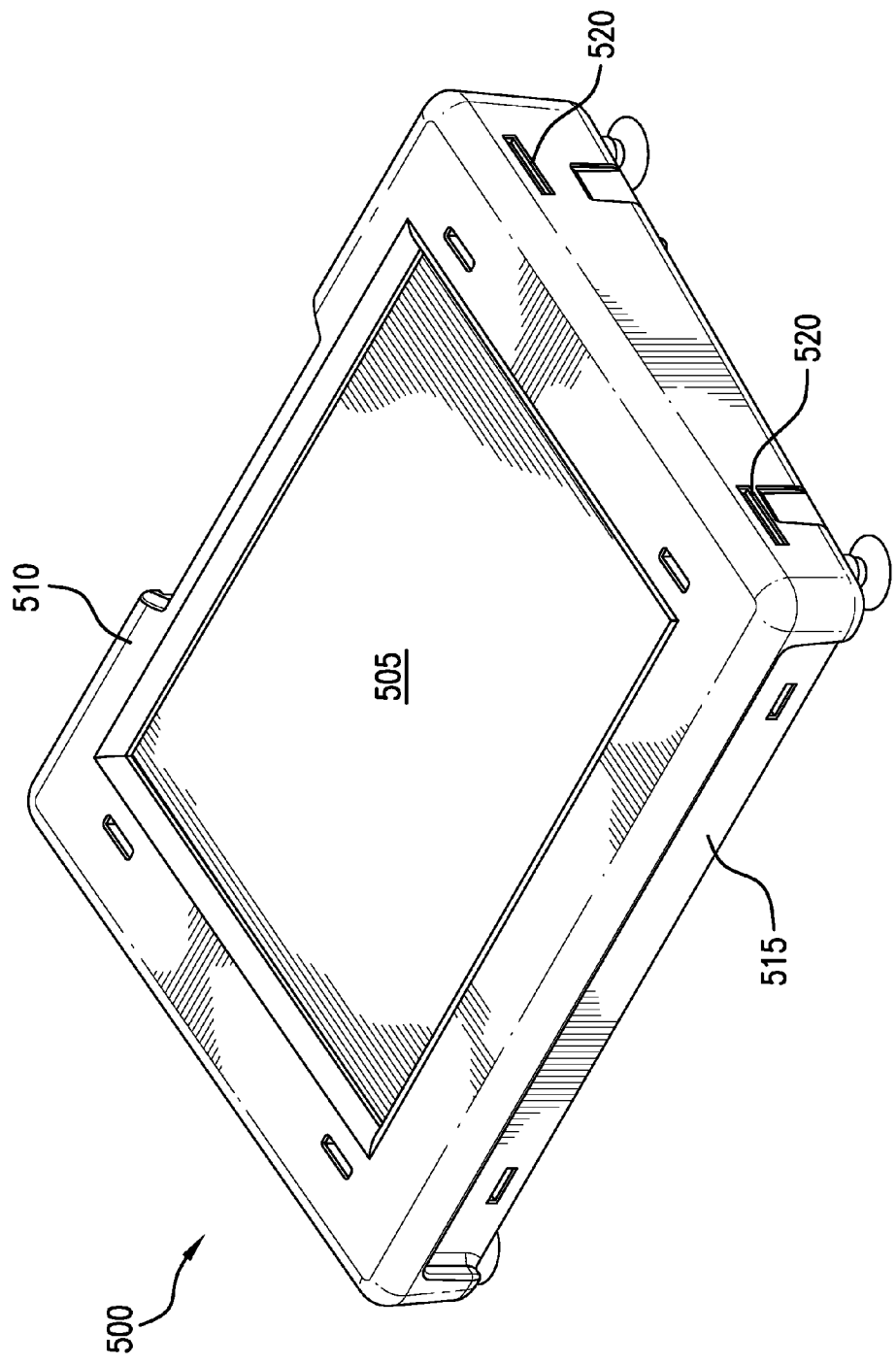
FIG. 5 depicts a perspective view of an exemplary portable activity center.

FIG. 5 depicts a perspective view of an exemplary portable activity center. In the FIG. 5 embodiment, an exemplary portable activity center 500 includes a substantially planar work area 505 framed by a work piece holder 510. The work piece holder 510 may movably attach to a base unit 515. The base unit may have a storage space for things such as games or toys, for example. In the depicted embodiment, attachment recess features 520 may sized to receive the attachment features 270 depicted in FIG. 2A. Such complementary attachment features may provide means for attaching presentation systems to portable activity centers.

Figure 6:
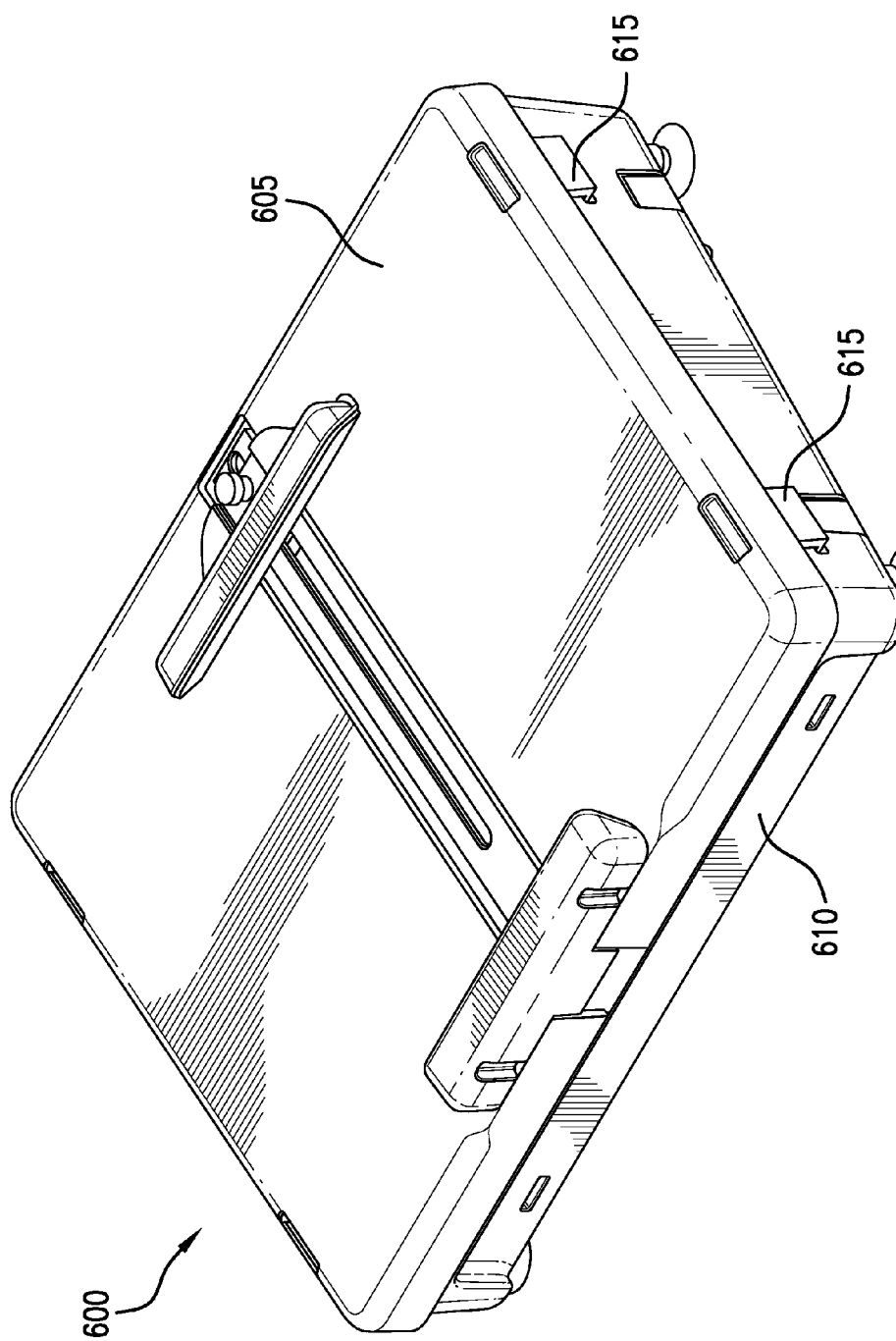
FIG. 6 depicts a perspective view of an exemplary child's entertainment center.

FIG. 6 depicts a perspective view of an exemplary child's entertainment center. In the FIG. 6 depiction, an exemplary child's entertainment center 600 includes an exemplary portable-device presentation system 605 attached to an exemplary portable drawing station 610. Various means of releasably attaching a presentation system 605 to a portable drawing station 610 may be used. In some embodiments a spring loaded release member may be pressed to release the attachment means. In some embodiments, the attachment means may include snapping the presentation system 605 to the portable drawing station 610. In the depicted embodiment, snapping tabs 615 attach the presentation system 605 to the portable drawing station 610 via complimentary recesses 520. In some embodiments, hook and loop attachment means may be used to releasably attach the presentation system 605 to the portable drawing station 610.

Although various embodiments have been described with reference to the Figures, other embodiments are possible. Exemplary portable activity centers are described, for example, with reference to at least FIGS. 1-16 in U.S. patent application Ser. No. 13/352,305 titled "Substrate-Retaining Holder," filed on Jan. 17, 2012, the entire disclosure of which is herein incorporated by reference. Exemplary portable-device presentation systems are described, for example, with reference to at least FIGS. 1A-5 in U.S. patent application No. 61/919,608 titled "Accessory Station," filed on Dec. 20, 2013, the entire disclosure of which is herein incorporated by reference. Some embodiments of presentation systems may include a power connector to provide power to an attached mobile display device.

In an illustrative embodiment, a portable-device presentation system may include a substrate having a substantially-planar top surface. Some exemplary presentation systems may have a first clamp member coupled to the substrate. The first clamp member may have a first portable-device contacting surface that has substantially no curvature along a first axis substantially parallel to the substantially-planar top surface or the substrate at a contact elevation above the substantially-planar top surface of the substrate. In some embodiments, a presentation system may have a second clamp member slidably coupled to the substrate. The second clamp member may have a second portable-device contacting surface that has substantially no curvature along a second axis substantially parallel to the substantially-planar top surface of the substrate at the contact elevation above the substantially-planar top surface of the substrate. The second axis may be substantially parallel to the first axis. When a user slides the second clamp member to a maximum display-size position and lays a display device on the substantially-planar substrate between the fixed clamp member and the second clamp member, the user may then secure the display device to the presentation system by sliding the second clamp member to sandwich the display device between the first portable-device contacting surface of the first clamp member and the second portable-device contacting surface of the second clamp member and there securing the second clamp member using a hand-operated securing member.

In an illustrative embodiment, the first clamp may be rigidly coupled to the substantially-planar substrate. When the second clamp is adjusted to the maximum display-size position, a separation distance between the first and second axes is a maximum display dimension. When the slidable clamp is adjusted to a minimum display-size position, the separation distance between the first and second axes is a minimum display dimension. A ratio between the maximum display dimension and the minimum display dimension may be at least 3:1. In various embodiments, the ratio between the maximum display dimension and the minimum display dimension may be 2:1, 4:1, 5:1, or any reasonable ration. In some embodiments, each of the first and the second portable-device contacting surfaces may include a deformable material. In an exemplary embodiment, each of the first and the second portable-device contacting surfaces may be substantially-planar. In some embodiments, a normal vector for the planes of each of the first and the second portable-device contacting surfaces may make an angle with the normal vector of the substantially-planar top surface, the angle being greater than 90 degrees. Such an angle may result in contacting surfaces having a projecting feature directly above the captured display device at the contact interface.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A portable-device presentation system comprising:
   a substrate having a substantially-planar top surface;
   a plurality of clips integrally formed and interiorly biased to releasably engage the substrate to a portable drawing station for storage, insertion, and removal of a sheet of paper and for providing access to said sheet of paper when inserted or stored, said portable drawing station comprising:
      a holder having an access opening;
      means for inserting and removing a planar substrate into and from said holder;
      means for retaining the sheet of paper received through said means for insertion and removal within said holder; and
   means for positioning the sheet of paper to be accessed through said access opening;
   a first clamp member coupled to the substrate, the first clamp member having a first portable-device contacting surface at an acute angle to the substantially-planar top surface of the substrate; and
   a second clamp member slidably coupled to the substrate, the second clamp member having a second portable-device contacting surface at an acute angle to the substantially-planar top surface of the substrate,
   wherein when a user slides the second clamp member to a maximum display-size position and lays a display device on the substantially-planar substrate between the first clamp member and the second clamp member, the user may then secure the display device to the presentation system by sliding the second clamp member to sandwich the display device between the first portable-device contacting surface of the first clamp member and the second portable-device contacting surface of the second clamp member and there securing the second clamp member using a hand-operated securing member.

2. The portable-device presentation system of claim 1, wherein the first clamp is rigidly coupled to the substantially-planar substrate.

3. The portable-device presentation system of claim 1, wherein when the second clamp is adjusted to the maximum display-size position, a separation distance between axes of the first and second clamp members is a maximum display dimension, wherein when the second clamp is adjusted to a minimum display-size position, the separation distance between the axes of the first and second clamp members is a minimum display dimension, wherein a ratio between the maximum display dimension and the minimum display dimension is at least 3:1.

4. The portable-device presentation system of claim 1, wherein each of the first and the second portable-device contacting surfaces comprise a deformable material.

5. The portable-device presentation system of claim 1, wherein each of the first and the second portable-device contacting surfaces are substantially-planar.

6. The portable-device presentation system of claim 5, wherein a normal vector for planes of each of the first and the second portable-device contacting surfaces makes an angle with a normal vector of the substantially-planar top surface, the angle being greater than 90 degrees.

7. A portable-device presentation system comprising:
a substrate having a substantially-planar top surface;
a plurality of clips integrally formed and interiorly biased to releasably engage the substrate to a portable drawing station for storage, insertion, and removal of a sheet of paper and for providing access to said sheet of paper when inserted or stored, said portable drawing station comprising:
a holder having an access opening;
means for inserting and removing a planar substrate into and from said holder;
means for retaining the sheet of paper received through said means for insertion and removal within said holder; and
means for positioning the sheet of paper to be accessed through said access opening;
a portable-device holder comprising;
a first clamp member coupled to the substrate, the first clamp member having a first portable-device contacting surface; and
a second clamp member slidably coupled to the substrate, the second clamp member having a second portable-device contacting surface; and
a display screen presentation module having a pivot member to pivot the portable-device holder with respect to the substrate,
wherein when a user slides the second clamp member to a maximum display-size position and lays a display device on the substantially-planar substrate between the fixed clamp member and the second clamp member, the user may then secure the display device to the presentation system by sliding the second clamp member to sandwich the display device between the first portable-device contacting surface of the first clamp member and the second portable-device contacting surface of the second clamp member and there securing the second clamp member using a hand-operated securing member.

8. The portable-device presentation system of claim 7, wherein the presentation module includes a releasably securing member having a fixed mode and a pivotable mode, wherein when in the fixed mode, the portable-device holder is secured in a display orientation, and when in the pivotable mode, the portable-device holder may be pivotably rotated to any display orientation between a horizontal orientation and a maximally inclined orientation.

9. The portable-device presentation system of claim 7, wherein each of the first and the second portable-device contacting surfaces comprise a deformable material.

10. The portable-device presentation system of claim 7, wherein each of the first and the second portable-device contacting surfaces are substantially-planar.

11. The portable-device presentation system of claim 7, wherein a normal vector for planes of each of the first and the second portable-device contacting surfaces makes an angle with a normal vector of the substantially-planar top surface, the angle being greater than 90 degrees.

12. A child's entertainment center comprising:
a portable drawing station for storage, insertion, and removal of a sheet of paper and for providing access to said sheet of paper when inserted or stored, said portable drawing station comprising:
a holder having an access opening;
means for inserting and removing a planar substrate into and from said holder;
means for retaining the planar substrate received through said means for insertion and removal within said holder; and
means for positioning the planar substrate to be accessed through said access opening; and,
a portable-device presentation system releasably attachable to the portable drawing station, the portable-device presentation system comprising:
a substrate having a substantially-planar top surface;
a plurality of clips integrally formed and interiorly biased to releasably engage the portable device presentation system to the portable drawing station; and,
a first clamp member coupled to the substrate, the first clamp member having a first portable-device contacting surface; and,
a second clamp member slidably coupled to the substrate, the second clamp member having a second portable-device contacting surface forming an acute angle with respect to the top surface of the portable device presentation system,
wherein when a user slides the second clamp member to a maximum display-size position and lays a display device on the substantially-planar substrate between the first clamp member and the second clamp member, the user may then secure the display device to the presentation system by sliding the second clamp member to sandwich the display device between the first portable-device contacting surface of the first clamp member and the second portable-device contacting surface of the second clamp member and there securing the second clamp member using a hand-operated securing member.

13. The child's entertainment center of claim 12, wherein the first clamp is rigidly coupled to the substrate.

14. The child's entertainment center of claim 12, wherein when the second clamp is adjusted to the maximum display-size position, a separation distance between axes of the first and second clamp members is a maximum display dimension, wherein when the second clamp is adjusted to a minimum display-size position, the separation distance between the axes of the first and second clamp members is a minimum display dimension, wherein a ratio between the maximum display dimension and the minimum display dimension is at least 3:1.

15. The child's entertainment center of claim 12, wherein each of the first and the second portable-device contacting surfaces comprise a deformable material.

16. The child's entertainment center of claim 12, wherein each of the first and the second portable-device contacting surfaces are substantially-planar.

* * * * *